Figure 1:
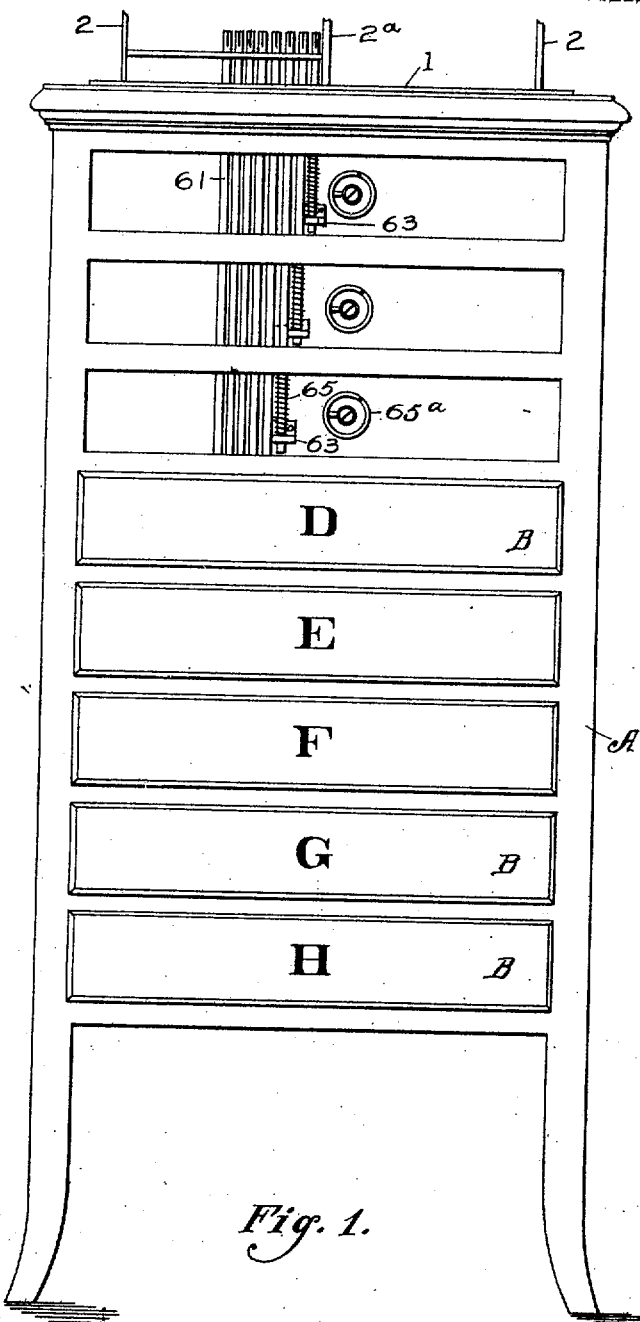

No. 871,094. PATENTED NOV. 12, 1907.
H. S. HALLWOOD.
MULTIPLE DRAWER CASH REGISTER.
APPLICATION FILED NOV. 3, 1906.

7 SHEETS—SHEET 1.

WITNESSES:
Brennan B. West
G. A. Myers

INVENTOR,
Henry S. Hallwood.
BY
Bates, Fouts & Hull
ATTORNEYS

No. 871,094.  
H. S. HALLWOOD.  
MULTIPLE DRAWER CASH REGISTER.  
APPLICATION FILED NOV. 3, 1906.
PATENTED NOV. 12, 1907.
7 SHEETS—SHEET 5.
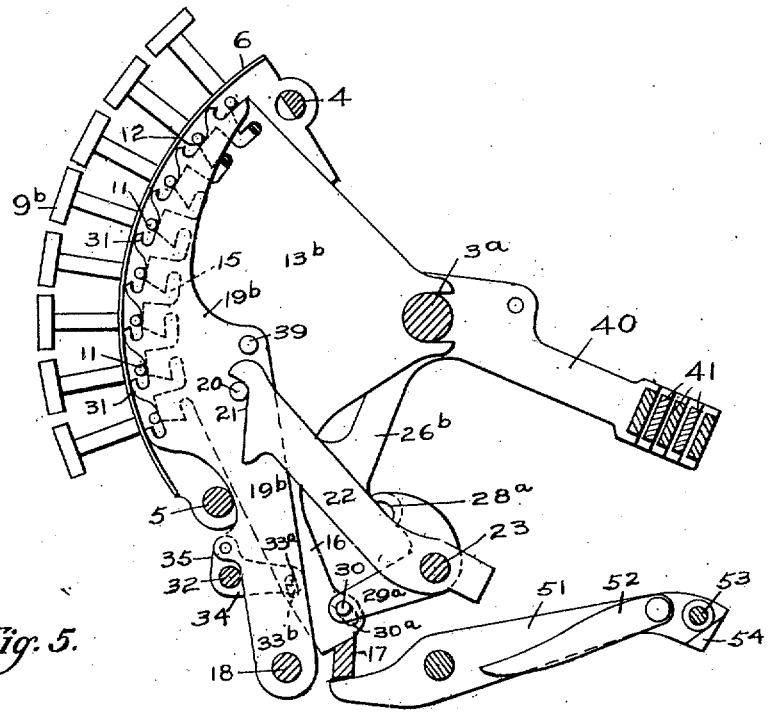
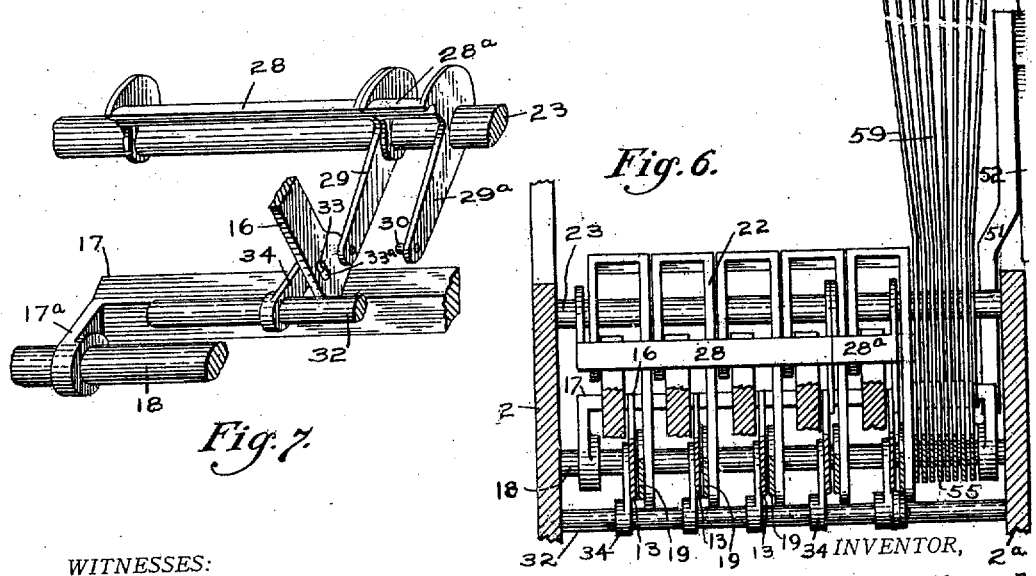
WITNESSES:  
INVENTOR,  
Henry S. Hallwood,  
BY  
ATTORNEYS No. 871,094. PATENTED NOV. 12, 1907.
H. S. HALLWOOD.
MULTIPLE DRAWER CASH REGISTER.
APPLICATION FILED NOV. 3, 1906.

INVENTOR,
Henry S. Hallwood,
BY Bates, Fouts & Hull
ATTORNEYS.

No. 871,094. PATENTED NOV. 12, 1907.
H. S. HALLWOOD.
MULTIPLE DRAWER CASH REGISTER.
APPLICATION FILED NOV. 3, 1906.

7 SHEETS—SHEET 7.

WITNESSES:
Brennan&West.
G. A. Myers.

INVENTOR,
Henry S. Hallwood
BY
Bates, Fouts & Hull
ATTORNEYS.

UNITED STATES PATENT OFFICE.

HENRY S. HALLWOOD, OF COLUMBUS, OHIO, ASSIGNOR TO THE INTERNATIONAL REGISTER COMPANY, OF COLUMBUS, OHIO, A CORPORATION OF OHIO.

MULTIPLE-DRAWER CASH-REGISTER.

No. 871,094. Specification of Letters Patent. Patented Nov. 12, 1907.

Application filed November 3, 1906. Serial No. 341,897.

*To all whom it may concern:*

Be it known that I, HENRY S. HALLWOOD, a citizen of the United States, residing at Columbus, in the county of Franklin and State of Ohio, have invented a certain new and useful Improvement in Multiple-Drawer Cash-Registers, of which the following is a full, clear, and exact description, reference being had to the accompanying drawings.

My improvement is shown as applied to the type of cash register that is shown and claimed generically in my pending applications Nos. 711,329,—filed April 1st, 1899; 735,748, filed Nov. 4th, 1899; and 28,740, filed Sept. 1st, 1900.

One of the several objects of the invention has particular relation to improvements in connection with the cash receptacles, where, owing to the large number used, it is necessary for them to be located in tiers one above the other. But this improvement particularly relates to an improvement upon the type of machine patented by W. F. Bockhoff, No. 616,866, Dec. 27th, 1898,—W. H. Muzzy, No. 748,406, Dec. 29th, 1903,—C. G. Heyne, No. 762,903, June 21st, 1904,—W. H. Muzzy, No. 773,091, Oct. 25th, 1904,—W. H. Muzzy, No. 775,087, Nov. 15th, 1904.

A further object of the invention is to provide a new form of detent for the value keys, department keys and clerks' initial keys, and interlocking mechanism between the three types of keys so as to prevent manipulation of the keys and to compel the operation of the keys in a predetermined sequence.

A further purpose of this invention is to enable each attendant using the cash register to have a separate cash drawer for his own particular use, in which may be segregated and individualized in a separate compartment thereof the nature and amount of each and every transaction. For example, in each drawer, for moneys received on account, a compartment is provided for duplicate receipts; for bills charged, a separate compartment is provided for the duplicates; and for moneys paid out, a separate compartment is provided for the receipts thereof, with the usual amount of tills and compartments for cash sales. This arrangement furnishes a complete check upon each and every transaction and enables the proprietor to individualize the responsibility for mistakes and also to fix the blame for the receipt of counterfeit bills or coins for shortages in making change.

In the patent to Bockhoff, there is employed a common means for releasing all the drawers, said means being set by separate connections with the character release keys, one of which is provided for each drawer. In my improved device, it will be observed, any drawer can be opened regardless of the operating mechanism, which may be manually held in normal position; and if the operating mechanism be not so held, the drawers will be released, by operating the keys in the order of their predetermined sequence, immediately before the indication has been made, and some time previous to the operation of the printing and recording mechanisms, thereby rendering the machine effective and rapid in its operation,—it being evident that the customer will instantly see the indication without being called upon to wait for a complete operation of the machine.

Figure 2:
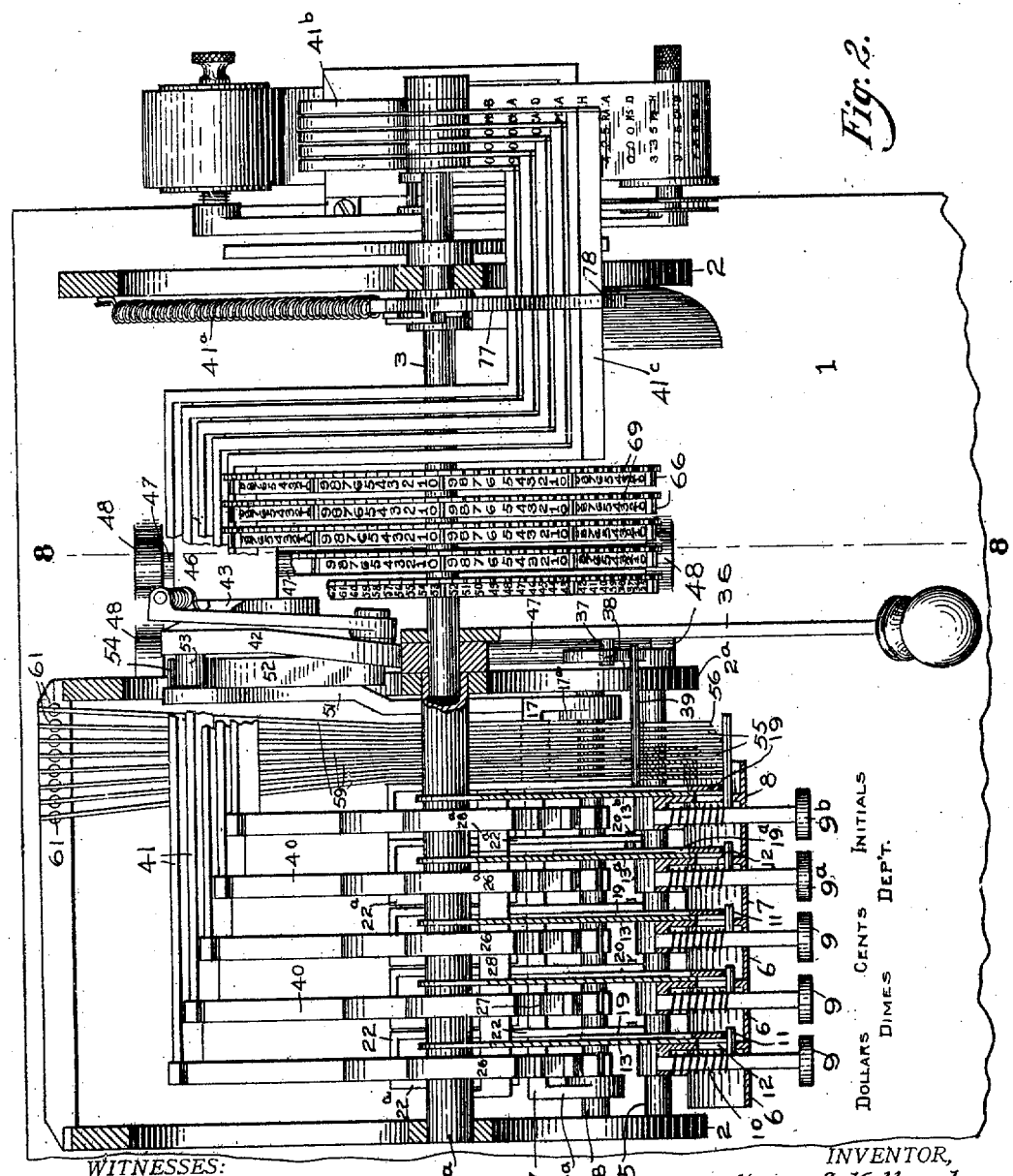
Figure 3:
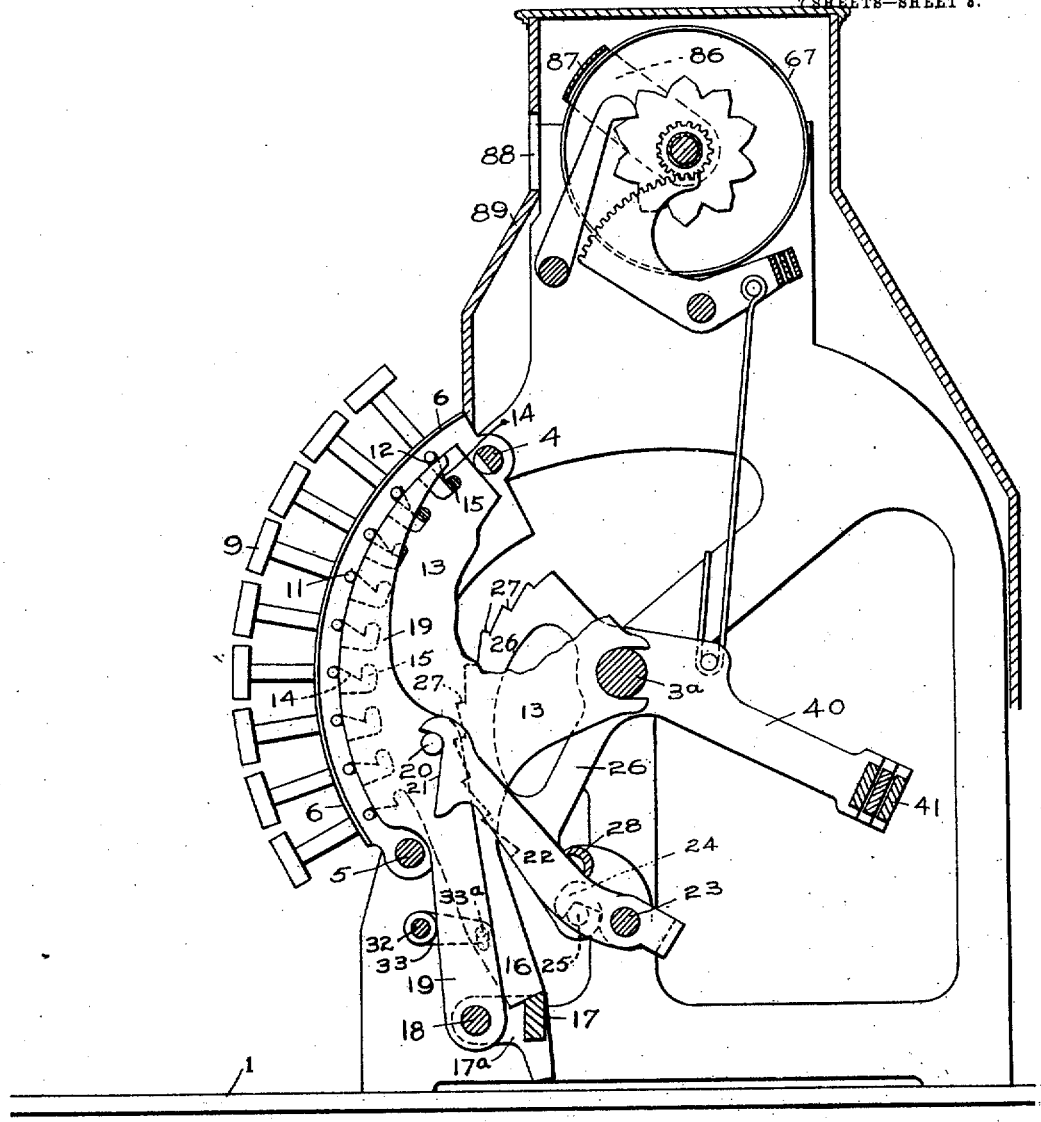
Figure 4:
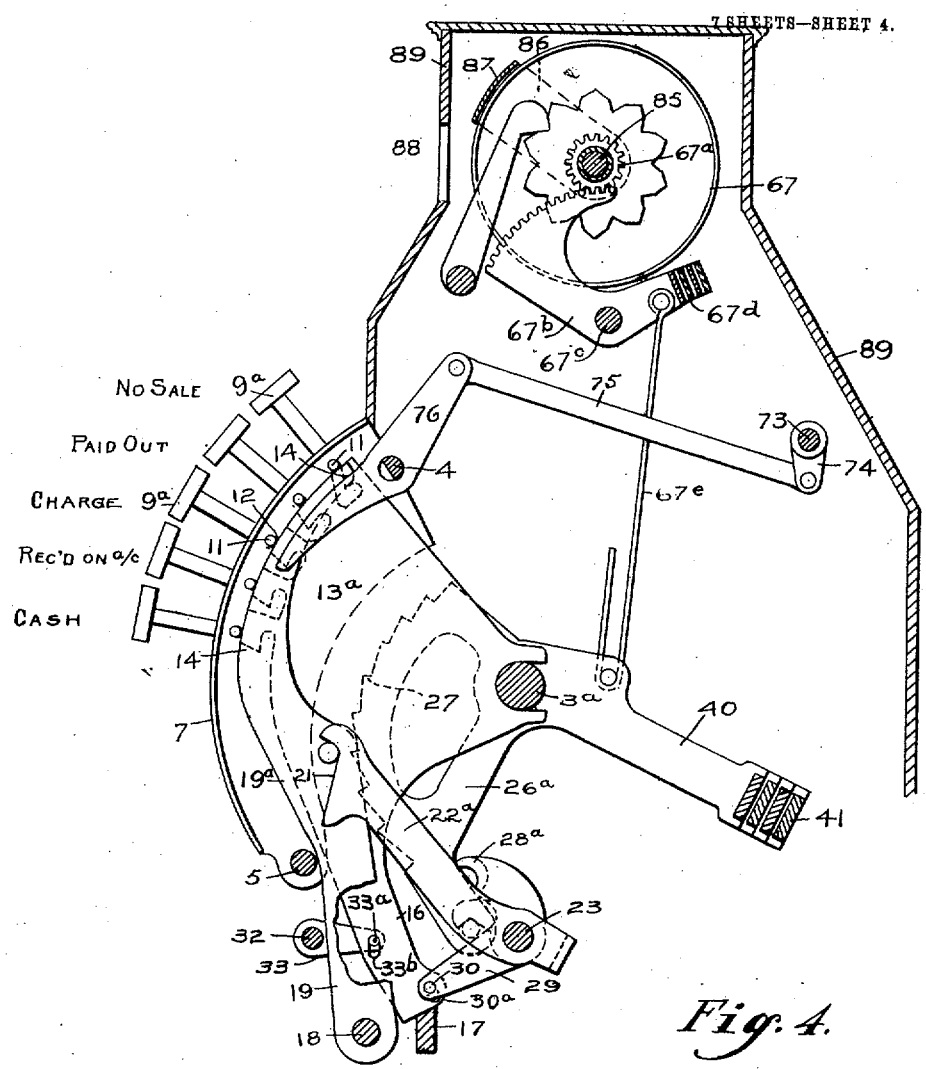
Figure 8:
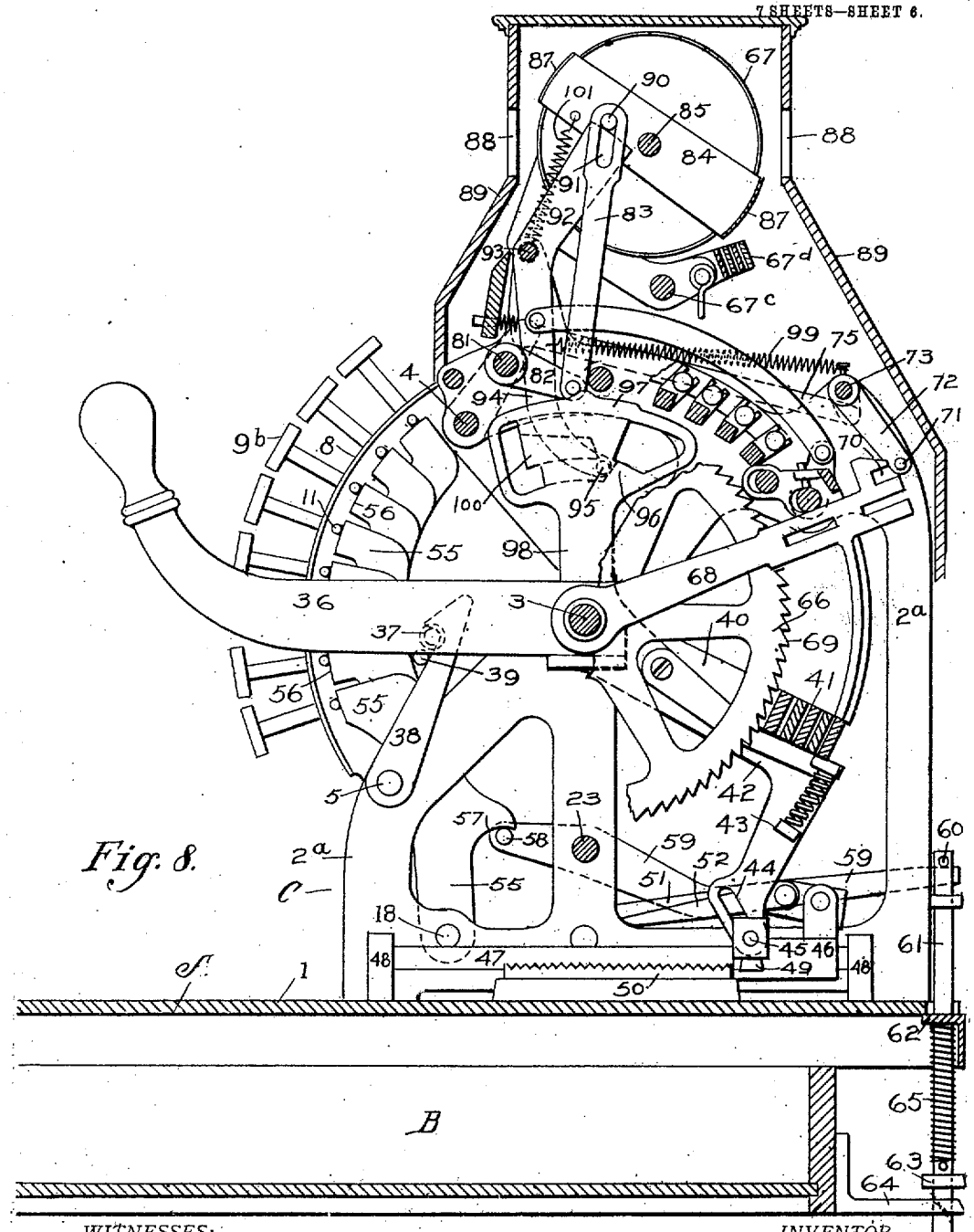
Figure 9:
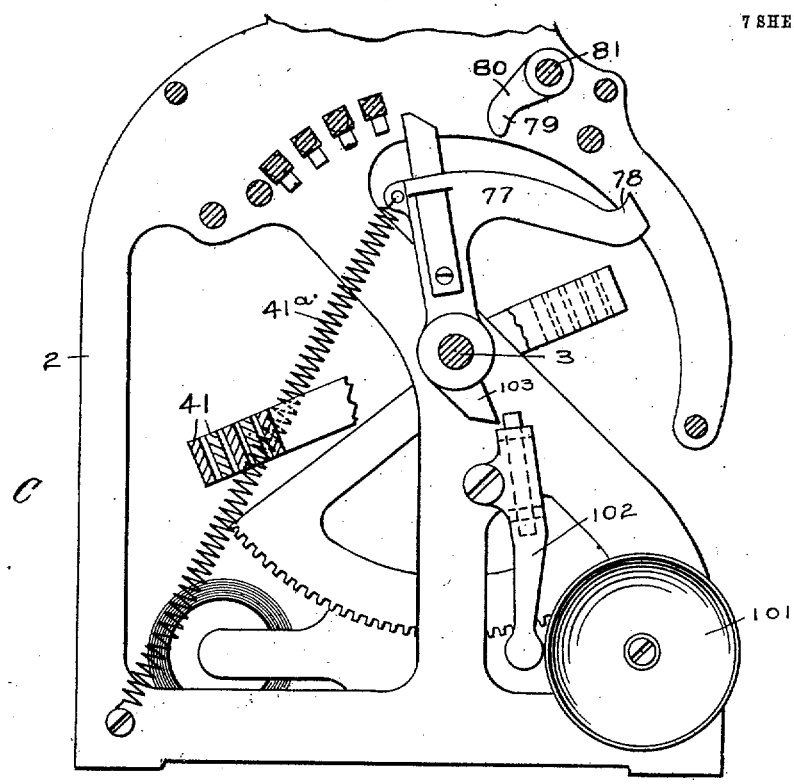
Figure 10:
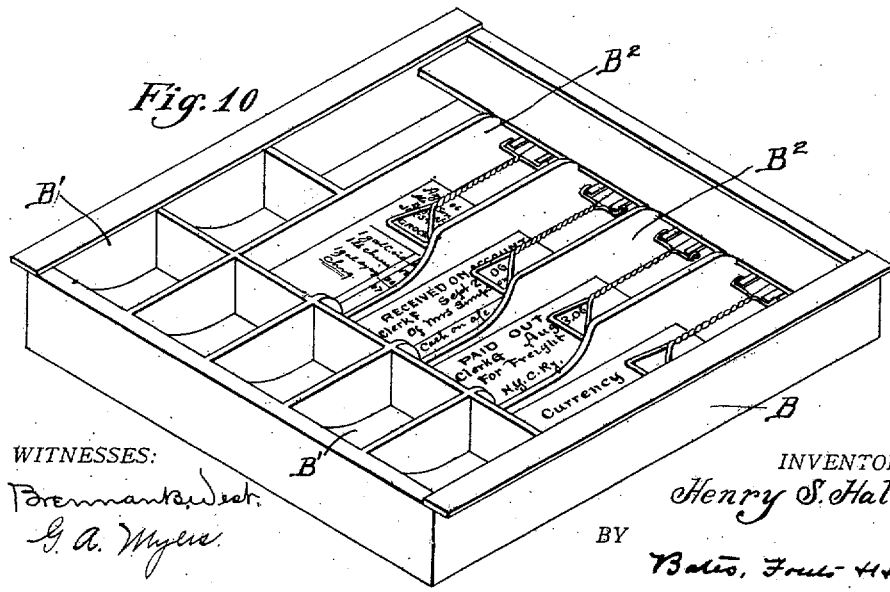

In the accompanying drawings, forming part of this application, Figure 1 is a front elevation of a cabinet containing a tier of drawers, some of said drawers being shown in position, said figure also showing parts of a cash register and the connections between the same and the drawers; Fig. 2 is a sectional view of the cash register, said view being taken on a horizontal plane substantially through the main operating shaft, and looking toward the cabinet; Fig. 3 is a transverse sectional view taken at the right of a bank of value keys and looking toward said keys; Fig. 4 is a similar view taken at the right of the bank of department keys; Fig. 5 is a similar view taken at the right of the bank of initial keys; Fig. 6 is a detailed plan view of portions of the drawer releasing mechanisms, some of the parts being shown in section; Fig. 7 is a perspective view of parts of the interlocking mechanism between the different classes of keys in the key board; Fig. 8 is a transverse sectional view through the cash register, said view being taken substantially on line 8—8 of Fig. 2, with parts broken away for clearness of illustration; Fig. 9 is a sectional view through the register, said view being also taken on line 8—8 of Fig. 2, but looking to the right, the adding wheels being removed; and Fig. 10 is a perspective view of a cash drawer, showing the compartments therein.

Like reference characters designate corresponding parts throughout the several views of the drawings, in which A represents a cabinet that is adapted to contain, in this instance, eight cash drawers B, said drawers being arranged one above the other and being adapted to slide forwardly, when released by the depression of the corresponding clerk's initial key, said movement of the cash drawers taking place before the registering and printing mechanisms have been operated, as will hereinafter appear.

Mounted on the top of the cabinet A, is the cash register embodying my invention, said register being provided with a base plate 1, to which is secured the upright side frames 2 and the center frame $2^a$, which frames support the oscillating operating shaft 3 and the stationary shaft $3^a$. The said frames also support various other rods, which will be more specifically referred to hereinafter. The stationary shaft, $3^a$, which may be tubular in section at its inner end, as shown in Fig. 2, is mounted in the left hand frame 2 and in the center frame 2ⁿ. The oscillating shaft 3 is journaled, at one of its ends, in the inner end of the stationary tubular shaft, and, near its opposite end, in the right hand frame 2. This construction is clearly illustrated in Fig. 2 of the drawings.

Mounted on the rods 4 and 5, are the value key guide frames 6, the department key guide frame 7, and the initial key guide frame 8. The value key guide frames are each provided with nine keys which are represented at 9, said keys being set radially from the shaft 3ⁿ. The rows of the value keys in the frames, reading from the left, represent dollars, dimes and cents. The keys, 9ⁿ, of the department key guide 7, denote the nature of transactions,—such as No. Sale, Paid Out, Charge, Recd. on Acct. and Cash. The keys, 9ᵇ, of the initial key guide frame 8, denote the clerks' initials, said initials corresponding to those on the cash drawers. All the keys are projected outwardly by springs 10 in the usual manner, said springs bearing against the pins 11, which extend through the slots 12 in the side of the key guide frames 6, 7 and 8.

Mounted loosely on the shaft 3ⁿ, and lying adjacent to the banks of value keys 9, are detent plates 13, each plate having its outer edge curved to coincide with the rows of pins 11 of the value keys. Said edge is also provided with beveled faces 14 and recesses 15 opposite each pin 11. Each of the detent plates 13 is also provided with a pendent arm 16, that is adapted to rest on a transverse bar 17, said bar extending across and under all the key banks. The bar 17 has its ends bent at right angles at 17ᵃ, through which ends it is journaled loosely on a rod 18. Lying adjacent to the detent plates 13, and oscillating on the rod 18, are the key latch plates 19, each of said latch plates having its forward edge curved to coincide with the lines of the pins 11 of the value keys, and each carrying near its rear edge a stud 20. These studs are adapted to engage with cam faces 21 on levers 22, said levers being journaled on the rod 23 and being bent back on themselves so as to form detent hooks 24, that are adapted to engage studs 25 on the lower ends of the stepped segments 26, said segments being loosely mounted on the shaft 3ᵃ. The construction is such that, when any one of the value keys 9 is depressed, its pin 11, bearing against the corresponding beveled face 14 of the detent plate 13, raises said plate slightly until the pin 11 enters the recess 15, when the plate drops and engages the pin 11, thereby preventing the key from returning to its normal position. Simultaneously, the pin 11 also bears against the corresponding latch plate 19, causing it to oscillate rearwardly; and, in so doing, its stud 20, bearing against the cam face 21 of the corresponding lever 22, causes it to oscillate rearwardly and thereby raise its hook 24 from engagement with the stud 25, thus permitting the stepped segment 26 corresponding to the bank of keys in which the key has been depressed, to oscillate until arrested by the end of the depressed key, which engages with its respective step or shoulder 27, in the manner peculiar to the Hallwood cash register, and as described in my Patent No. 704,795.

The keys 9 of the value banks are normally depressible and arrestable, are exchangeable by the full depression of any other key in the same bank, and are releasable by the partial depression of any other key in the same bank. This is due to the fact that after a pin 11 has been engaged by the detent plate, the latter will not drop below its normal position, as is shown in Fig. 3, so that any other key in that bank can be depressed. The depression of a second key will lift the detent so far that the pin on the key first depressed can escape from its recess in the detent plate, the key being moved outwardly by its spring 10.

At the rear of the department key bank, the detent plate 13ᵃ has its beveled face, 14, for the no sale key normally in position to be engaged by the pin 11 on said key, so that said key is normally depressible. The remainder of the department keys, however, have their beveled faces 14 normally out of line with the pins 11 on said keys, being removed therefrom a distance about equal to twice the diameter of the pins 11, said keys being thus normally locked out. Said remaining department keys are also locked out while the no sale key is in depressed position, as the detent plate 13ᵃ has then dropped to substantially its normal position, with the inclined faces thereon out of operative position with respect to the pins on the other department keys. As the no sale key is depressed, the detent plate 13ᵃ is slightly raised, but not sufficiently to allow any other key of the department bank to be operated.

Before any department key, other than the no sale key can be depressed, the detent plate 13 must be lifted so as to bring the inclined faces 14 into line with the pins 11 on the keys. The detent plate is lifted for this purpose by the value keys through mechanism now to be described.

Extending across and resting on levers 22 of the value banks, is a bar 28, see Figs. 3 and 7; said bar having its ends turned at right angles and journaled on the rod 23. That end, 29, of the bar, 28, that is adjacent to the department key bank, extends downwardly and forwardly and carries a stud, 30, which stud projects into a slot 30ᵃ, in the lower end of an arm 16 of the detent plate 13ᵃ at the rear of the department key bank, so that, when a lever 22 is oscillated by the depression of a value key, the bar 28 is oscillated on the shaft 23, and the detent plate 13ᵃ is raised or oscillated about the shaft 3ᵃ until the bevel faces 14ᵃ are in line with the pins 11 of all of the department keys, except the no sale key, which key is then locked against depression. The department key bank likewise has a latch plate 19ᵃ, a lever 22ᵃ, a stepped segment 26ᵃ, and a bar 28ᵃ. This bar is similar to the bar 28, heretofore described, except that it extends only from the department key bank to the initial key bank. The arm 29ᵃ of said bar, shown in Fig. 5, is pivotally secured to the depending arm 16 of the detent plate 13ᵇ of the initial key bank.

From the above description, it will be understood that the depression of a value key places the detent plate for the department keys in such position that any of said keys, except the no sale key, can be depressed. The depression of one of said department keys then operates, by lifting the initial detent plate, to unlock the initial keys.

It will be noted that the slots 30ᵃ in the arms 16 of the department and the initial detent plates, are elongated. The oscillation of the bars 28 and 28ᵃ lifts their corresponding detent plates a distance that is sufficient to just bring the inclined faces thereon into operative relation with the pins 11 on the keys. The depression of the keys must lift the detent plates a further distance, said latter movement of the plates being rendered possible by the elongated slots 30ᵃ.

When the detent plate, 13ᵃ, for the department key bank is lifted by the depression of a value key, the slot, through which the pin 11 of the no sale key may normally travel, is moved out of register with said key, so that the no sale key is locked against depression while a value key is out of its normal position.

Rigidly secured to a rock shaft 32, below the key board, is a series of arms 33, there being an arm 33 for each bank of value and department keys. These arms extend rearwardly and are each provided with a stud 33ᵃ, which projects into a slot 33ᵇ in the depending arms 16 of the detent plates 13 and 13ᵃ for the value and department key banks. The rocker arm 34 on the rear of the initial key bank has a short arm projection 35 on its upper edge, which arm is pivoted to the latch plate 19ᵇ of the initial bank. From this description it will be understood that, when the latch plate 19ᵇ is oscillated by the depression of an initial key, all the arms 34 are oscillated downwardly, thereby locking the detent plates of the value and department keys into engagement with the pins 11 in the depressed keys of these banks, and also locking out the undepressed keys in said banks.

From the above description, it will be understood that the value and the no sale keys are normally depressible; that the depression of a value key locks out the no sale key and renders the remaining keys of the department bank depressible; that the depression of one of said remaining keys unlocks the initial keys, and that the depression of an initial key locks all the value and department keys in their positions, whether they be depressed or otherwise.

Rigidly secured to the oscillating shaft 3, is the main operating hand lever 36, said lever having a stud 37, that is projected laterally therefrom and is adapted to be engaged by a detent lever 38, said lever being journaled on the rod 5. Projecting from the initial latch plate 19ᵇ, is a pin 39, said pin being adapted to engage and oscillate the detent lever 38 when an initial key is depressed and thus release the main operating lever 36, which is then free to oscillate upwardly. Owing to the fact that the interlocking mechanism between the different series of keys compels the depression of a value and a department key before an initial key can be operated, it follows that the main operating lever cannot be released until after the various series of keys have been depressed in the above stated sequence. If such an operation were permitted, it might be possible to release the main operating lever without arresting the initial key used, in which case the indicator and recorder would fail to show what clerk had operated the machine. Such a release might be effected if the latch plate 19ᵇ for the initial keys were made plain on its front edge, as a sudden blow on an initial key could drive back the lock plate with sufficient force to release the detent lever 38 from the stud 37 without depressing the key far enough to cause its arrest by its detent plate 13ᵇ. To prevent such an operation, therefore, I provide the front edge of the latch plate, 19ᵇ, with a series of detent hooks 31, there being one of said hooks for each initial key. Normally, the detent plate is in a forward position, with the pins 11 of the initial keys resting thereagainst between the detent hooks, as shown in Fig. 5. When an initial key is depressed, the latch plate is oscillated on the rod 18, and this movement carries the detent hook for that key upwardly in front of the pin 11 on said key. The key and the latch plate thus become coupled together, so that any rearward movement of the latch plate that is sufficient to release the main operating lever will carry the operated key inwardly so far that it will be caught by its detent plate 13ᵇ. It will be understood that this construction prevents the release of the main operating lever without the depression of the initial key to such a position as will insure a correct and full indication and record.

When the latch plate 19ᵇ is oscillated, as above described, the hooks 31 thereon for the undepressed keys will be lifted into the rear of the pins 11 of said undepressed keys so as to prevent their operation. When a depressed initial key becomes locked by its detent plate 13ᵇ, therefore, it cannot be released by a subsequent depression of another initial key, but can be released only by the full operation of the main operating lever, as hereinafter described.

Extending rearwardly from the hubs of the stepped segments 26, are arms 40, to the ends of which are secured yokes or bars 41, which yokes extend across the rear side of the machine and, being bent at right angles, are journaled on the shaft 3. These yokes are normally supported in an approximately horizontal position by the hooks 24, which engage with the studs 25 on the stepped segments; but, when a key is depressed, the yoke that is attached to the stepped segment of that bank, is no longer detained by its hook 24, but it is then supported by a rearward extension 42 of the main operating lever 36. When, however, the said lever 36 is released from engagement with its detent lever 38, as hereinbefore described, the yoke drops downwardly until it is arrested by a step 27 on the stepped segment, which step contacts with the end of the depressed key.

When the main operating lever 36 is released, it is thrown upwardly, said movement being due to the weight of the extension 42 and the yokes 41, assisted, if desired, by a suitable spring, 41ᵃ, and the yokes drop to their positions, which positions are determined by the depressed keys. As the main operating lever is depressed, the yokes are returned to their normal positions.

Depending from the rear end of the extension 42 of the operating lever 36 is an arm 43, said arm having a slot 44 at its lower end, into which slot projects a pin 45, on a block 46, said block being adapted to slide on rods 47 that are fixed in upright supports 48, on the base plate 1. Pivoted to said block is a pawl 49, that is adapted to engage with the teeth of a serrated rack 50, for the purpose of compelling a complete oscillation of the operating lever 36 in either direction, in a manner well known in the art.

Pivoted to the center frame 2ᵃ on the rod 23 is a lever 51, the short forward end of which projects beneath the bar 17, upon which rest the depending arms of the detent plates. To the rear end of the lever 51, there is pivoted a pawl 52, see Fig. 5, which projects forwardly in such a manner that a roller 53, projecting laterally from the sliding block 46, will pass under the pawl 52 on its forward movement and over the top thereof on its rearward movement. As the roller passes over the pawl 52, the lever 51 is depressed at its rear end, which operation causes its forward end to raise the bar 17 and the detent plates that are supported thereon, thus releasing the key pins 11 that have been held in the recesses 15 of said detent plates.

Projecting laterally from the rear end of the lever 51, in a position to be engaged by the roller 53 on the sliding block 46, is a lug 54, said lug and roller operating through the lever to normally hold the detent plates 13 in the proper position for the reception of the cross pins 11 of the value keys when said keys are depressed.

Mounted on the rod 18, adjacent to the latch plate 19$^b$ of the initial bank, is a group of drawer release plates 55, there being one of said plates for each drawer. Each plate has, on its forward edge at its upper end, a bearing surface 56, that is adapted to be engaged by the cross pin 11 of the corresponding initial key. Each of said plates is also provided with a shoulder 57 on its rear edge, said shoulder being adapted to bear upon a stud 58 on the forward end of a drawer release lever 59, there being one of said release levers for each initial key and for each cash drawer. Said drawer release levers are pivoted on the rod 23, and they are extended rearwardly so as to engage with pins 60 in the drawer latch-bolts 61. Said latch bolts 61 are mounted in guide plates 62 and 63 on the inside of the cabinet frame A, one of the lower guide plates, 63, being located at the rear of each drawer B. Each of said drawers is provided with a catch plate 64, that is adapted to receive one of the latch bolts 61 and holds the drawer in closed position, the latch bolts being normally held in engagement with its catch plate by a spring 65. From this description, it will be understood that when an initial key is depressed, its cross pin 11 will engage with its respective drawer release plate 55, oscillating the same rearwardly and thereby also oscillating its drawer release lever 59, so as to lift its latch bolt 61 from its catch plate 64, thereby releasing the drawer corresponding to the depressed key. When a drawer is thus released, it is thrust forwardly by its spring 65$^a$ in the usual manner, said springs appearing in Fig. 1 of the drawings. As the cash drawers can be opened only by the depression of the initial keys, and the full depression of one of said keys locks out all the remaining keys in that bank, it follows that no drawer corresponding to either of said remaining keys can be opened until after the depressed key has been released, which release does not take place until the main operating lever has substantially completed its downward stroke. Therefore, while any drawer may be opened irrespective of the operation of the main actuating lever, which may be held against movement, said drawer cannot become relatched until its initial key is released, which release requires a full operation of the cash register. Furthermore, while one drawer remains unlatched, a second drawer cannot be released. In order to prevent the simultaneous depression of more than one initial key, any suitable form of interlocking mechanism may be employed between said keys so as to permit but a single key to be depressed. As such interlocking mechanism is common in the art, it is not deemed necessary to show the same herein, a suitable form being illustrated in my pending application No. 28,740.

In Fig. 10, I have illustrated my preferred form of cash drawer B, the same containing a plurality of compartments B′ for change, and a plurality of compartments B$^2$, in which the clerk may place in proper order his duplicate receipts for such special transactions as may require the same.

When "charge" or "paid out" transactions are made, the amount of the transaction should be shown on the record strip and on the indicators, but it should not be added on the counter wheels. I, therefore, provide a device for preventing the counting wheels 66 from being turned in the operation of the machine, although the indicators and printing devices operate in the usual manner.

Mounted on the shaft 3, between the counting wheels 66, are arms 68, said arms projecting rearwardly and being supported on those yoke bars 41 that correspond to the several banks of value keys. A plunger pawl, not shown, is secured to the side of each of the arms 68 on the portion thereof that projects beyond the periphery of the counter wheels, said pawls being adapted to engage with the teeth 69 of the counter wheels 66, and to turn the same, in a manner well known in the art, and as is particularly set forth in my pending application No. 28,740. Extending from the upper side of the projecting ends of the arms 68 are hooks 70, said hooks being adapted to be engaged by a pin 71 in the free end of a rock arm 72, that is rigidly mounted on a rock shaft 73, which shaft has its bearings in the frames 2 and 2$^a$. Also rigidly mounted on one end of said shaft 73, is an arm 74, said arm being connected by a link 75, with one end of the pivoted lever 76, that is mounted on the rod 4. The opposite end of said lever 75 lies adjacent to the latch plate 19$^a$ of the department key bank, and it is adapted to be engaged by the pins 11 of the "charge" and "paid out" keys, so that, when either of these keys is depressed, the levers 76 and 74 will be oscillated, and the pin 71 will be caused to engage the hooks 70 on the pawl carrying arms 68, and thus retain said arms in their normal position when the yokes are dropped during the operation of the machine.

Mounted upon a shaft 85 in the upper part of the register are a double series of indicator wheels, 67, there being an indicator wheel in each series for each of the banks of keys in the key board. Each of these indicator wheels is provided with a pinion 67$^a$, with which meshes a toothed segment 67$^b$, which segments are pivoted on the cross shaft 67$^c$. One of the series of indicator wheels is adapted to be viewed by the operator of the machine through a window 88 in the front of the casing, and the other series is adapted to be viewed by the customer through a similar window in the rear of the casing, as shown in Fig. 8. The corresponding toothed segments 67$^f$ are connected together by a yoke-strap 67$^d$, so that said corresponding segments and their respective indicator wheels will turn together.

The toothed segments are moved by the arms 40 of the stepped segments, through links 67$^e$.

After all the keys showing the transaction have been depressed and the operating lever 36 has been released, the indication of the previous transaction is canceled, and, at the same time, the indicator wheels are concealed by shields or flashes that are brought over the indicators 67, and are maintained in that position until the operating lever 36 has made substantially its full upward stroke. The flashes are moved to disclose the indicators by the following means.

Rigidly secured to the shaft 3, is a bent arm 77, (see Figs. 2 and 9), said arm having at its extremity a hook 78 that is adapted, when the shaft 3 is oscillated, to engage a lug 79, on a rocker arm 80, said rocker arm being rigidly secured to a rock shaft 81, that is journaled in the frames 2 and 2ᵃ. Also rigidly secured to the shaft 81 is another arm 82, which arm is connected by a slotted bar 83 to an oscillating plate or lever 84, that is pivoted on the indicator shaft 85. The plate or lever 84 has a length that is slightly greater than the diameter of the indicator wheels 67, said plate or lever being situated about midway the length of the machine. At either end of the machine, and extending in opposite directions from the shaft 85, are the arms 86, to the outer ends of which, and to the ends of the plate or lever 84, are secured the flashes or shields 87, said flashes consisting of thin metal strips that are adapted to cover the windows or slots 88 in the front and the back of the casing 89, and thus hide the indicators while they are changing to indicate the new transaction. When, however, the indicators have been set to their proper reading, the strips 87 are moved to disclose the record on the indicators 67, which movement is accomplished by the oscillation of the shaft 81, as hereinbefore described.

Fig. 8 of the drawings shows the flashes or shields in their normal positions, the indicators being disclosed through the windows 88 in the casing 89. When in this position, the flashes are normally detained by a pin 90, that is carried by the plate or lever 84, said pin resting against the upper edge of a strut lever 92, said lever being pivoted upon the shaft 93. The lower arm 94 of this lever is provided with a laterally projecting pin 95, that normally rests against a shoulder 96, formed in the head 97, of a cam lever 98, said cam lever being secured to the main operating lever 36 so as to be moved therewith in the initial operation of the machine, and to be returned thereby during the final operation thereof. The strut lever 92 is normally under spring pressure, from a spring 99, which is secured at one of its ends to the arm 94 of said strut lever and at its opposite end to a stationary part of the cash register. This spring normally holds the pin 95 into contact with the lug 96.

Supported within the head 97 of the cam lever 98 is a central lateral projection 100, said projection forming, with the outer parts of the head, a race-way for the pin 95. As soon as the cam lever moves rearwardly from the position shown in Fig. 8, the arm 94 of the strut lever is drawn rearwardly by the spring 99, the pin 95 passing upwardly between the lug 96 and the end of the projection 100. This movement of the strut lever removes the upper edge of the latter from its engagement with the pin 90, whereupon the flashes will be brought into operative position for concealing the indicator wheels by a coiled spring 101, which spring is attached at one end to the plate or lever 84 and at its opposite end to the shaft 93. The strut lever is retained in the position just specified by its spring 99 until the beginning of the return movement of the main operating lever, at which time the pin 95 will engage with the forward edge of the projection 100 in the head 97, which forward edge will rock the upper end of the strut lever rearwardly. Just prior to this movement, however, the shaft 81 has been rocked by the engagement of the hook 78 with the lever 80, as hereinbefore described, and the flashes have been returned to the position shown in Fig. 8, so that the strut lever may be carried below the pin 90. Said strut lever is held in this position during the entire return movement of the main operating lever by reason of the fact that the pin 95 is at that time in engagement with the underside of the projection 100, said projection holding the pin it its desired position until the lug 96 is again brought into engagement therewith, which lug holds the pin until the beginning of the next initial movement of the main operating lever. From this description it will be understood that the indicators are normally disclosed through the reading openings or windows 88 in the casing, but said indicators are concealed from view during that part of the operation of the machine in which they are changing so as to indicate a new transaction. It will also be understood that at substantially the end of the initial movement of the main operating lever, the indicators will be again disclosed and will remain so disclosed until the beginning of the next operation of the machine, when they are again set to indicate the next operation.

The printer is shown in Fig. 2 of the drawings in a conventional form only, as I desire it to be understood that any suitable form of printing device may be combined with the other features of my invention heretofore described. As shown, the printer is provided with type carriers or segments 41ᵇ, which are connected through yoke straps 41ᶜ with the respective yokes or bars 41 heretofore described, said type carriers and connections being well known in the type of machine to which my invention is applied, and being particularly shown in my said application No. 28,740. As each of the yokes or bars 41 is under control of its respective bank of keys in the key board, it will be understood that the type carriers are likewise controlled by said banks of keys, so that the depression of the keys in said key board, followed by the initial movement of the main operating lever, results in setting the type carriers in such position that the characters thereon corresponding with the characters on the depressed keys will be brought into position for producing a record showing the value of the transaction, the character of the transaction and also the particular clerk that has operated the machine, or the particular cash drawer that has been released by such operation. Thereafter, as the main operating lever is returned to normal position, the printing operation is effected by any suitable means, not necessary to describe, which means may be substantially like that shown in my said application.

In Fig. 9, I have shown at 101 an alarm bell that is adapted to be sounded twice for each operation of the machine. The hammer 102 for the bell is rocked by a cam 103 that is connected with the lever arm 77. When the main operating lever 36 starts on its initial movement, the hammer is thrown away from the bell by the cam 103: but, as soon as the cam disengages the hammer, the latter is thrown against the bell by a spring, not shown. This operation will be repeated just as the main operating lever returns to its normal position.

I claim:

1. In a cash register, an accounting device, a series of oscillating yokes for operating said device, a normally locked oscillatory hand lever for operating said yokes, a series of amount setting elements for controlling said yokes, a series of special transaction setting elements and a series of clerks' setting elements, interlocking mechanism between the amount and the special transaction setting elements compelling a certain sequence of operation thereof, interlocking mechanism between the special transaction and the clerks' setting elements compelling a certain sequence of operation thereof, a plurality of cash drawers, one for each clerk's setting element, and connections between each clerk's setting element and the corresponding cash drawer and between each clerk's setting element and the oscillatory hand lever, whereby the operation of any one of said clerks' setting elements will release the hand lever and its corresponding cash drawer.

2. In a cash register, a series of amount setting elements, a series of clerks' setting elements and special transaction setting elements, interlocking mechanism between the amount and the special transaction setting elements compelling a certain sequence of operation thereof, interlocking mechanism between the special transaction and the clerks' setting elements compelling a certain sequence of operation thereof, a plurality of cash drawers, one for each clerk's setting element, connections between each clerk's setting element and the corresponding cash drawer, and a recording device adapted to produce a record showing which clerk's setting element has been operated.

3. In a cash register, a series of amount setting elements, a series of clerks' setting elements and a special transaction setting element, interlocking mechanism between the amount and the special transaction setting elements compelling a certain sequence of operation thereof, interlocking mechanism between the special transaction and the clerks' setting elements compelling a certain sequence of operation thereof, a plurality of cash drawers, one for each clerk's setting element, connections between each clerk's setting element and the corresponding cash drawer, whereby the operation of any of said clerks' setting elements will release its corresponding drawer, and means for producing a record showing which drawer has been released the amount and the character of the transaction.

4. In a cash register, a normally locked oscillatory hand lever a plurality of cash safes, a keyboard mechanism comprising groups of value keys, department keys and clerks' keys, there being a clerk's key for each cash safe, interlocking mechanisms between said groups of keys which compel the operation of the keys in said groups in a predetermined sequence only, and means under control of each key in the clerks' group for disclosing the cash safe corresponding thereto and for releasing the hand lever.

5. In a cash register, a normally locked oscillatory hand lever a plurality of cash drawers, a keyboard mechanism comprising groups of value keys, department keys and clerks' keys, there being a clerk's key for each cash drawer, interlocking mechanisms between said groups of keys which compel the operation of the keys in said groups in a predetermined sequence only, and means under control of each key in the clerks' group for releasing the cash drawer corresponding thereto and for releasing the hand lever.

6. In a cash register, a plurality of cash drawers, a keyboard mechanism comprising groups of value keys, department keys and clerks' keys, there being a clerk's key for each cash drawer, interlocking mechanisms between said groups of keys which compel the operation of the keys in said groups in a predetermined sequence only, means under control of each key in the clerks' group for releasing the cash drawer corresponding thereto, and a recording device that is adapted to produce a record showing what drawer has been used.

7. In a cash register, a plurality of cash safes, a plurality of normally operative value setting elements, a plurality of normally inoperative department setting elements, a plurality of normally inoperative clerks' setting elements, interlocking mechanism between the value setting elements and the department setting elements requiring the operation of a value setting element before a department setting element can be operated, interlocking mechanism between the department setting elements and the clerks' setting elements, requiring the operation of a department setting element before a clerk's setting element can be operated, and connections between each of said clerk's setting elements, and its corresponding cash safe, whereby the operation of a clerk's setting element will release the safe belonging thereto.

8. In a cash register, a plurality of cash drawers, a group of normally operative value keys, a group of normally inoperative department keys, a group of normally inoperative clerks' initial keys, interlocking mechanism between the value keys and the department keys requiring the depression of a value key before a department key can be operated, interlocking mechanism between the department keys and the clerks' initial keys, requiring the operation of a department key before a clerk's initial key can be depressed, and connections between each of said clerks' initial keys and its corresponding cash drawer, whereby the operation of a clerk's initial key will release the drawer belonging thereto.

9. In a cash register, a plurality of cash drawers, a group of normally operative value keys, a group of normally inoperative department keys, a group of normally inoperative clerks' initial keys, interlocking mechanism between the value keys and the department keys requiring the depression of a value key before a department key can be operated, interlocking mechanism between the department keys and the clerks' initial keys, requiring the operation of a department key before a clerk's initial key can be depressed, connections between each of said clerk's initial keys and its corresponding cash drawer, whereby the operation of a clerk's initial key will release the drawer belonging thereto, and a recording device that is adapted to produce a record showing which drawer has been released.

10. In a cash register, groups of value, department and initial keys, said department and initial keys being normally locked, means operated by any key of the value groups for unlocking the keys of the department group, means operated by any key of the department group for unlocking the keys of the initial group, a plurality of cash drawers, one for each of the keys of the initial group, and connections between each key of the initial group and its corresponding cash drawer, whereby the operation of an initial key will release its corresponding cash drawer.

11. In a cash register, a normally locked main actuating member, groups of value, department and initial keys, said department and initial keys being normally locked, means operated by any key of the value groups for unlocking the keys of the department group, means operated by any key of the department group for unlocking the keys of the initial group, a plurality of cash drawers, one for each of the keys of the initial group, connections between each key of the initial group and its corresponding cash drawer, whereby the operation of an initial key will release its corresponding cash drawer, connections between each key of the initial group and the main actuating member for unlocking the latter upon the operation of an initial key, and means for preventing the subsequent release of a second cash drawer until after the main operating lever is returned to normal position.

12. In a cash register, groups of value, department and initial keys, said department and initial keys being normally locked, means operated by any key of the value groups for unlocking the keys of the department group, means operated by any key of the department group for unlocking the keys of the initial group, a plurality of cash drawers, one for each of the keys of the initial group, connections between each key of the initial group and its corresponding cash drawer, whereby the operation of an initial key will release its corresponding cash drawer, and a recording device that is adapted to produce a record showing which drawer has been released.

13. In a cash register, the combination of a plurality of groups of keys, one of said groups being normally operative, means for rendering the other groups of keys normally inoperative means operated by any of said operative keys for rendering the adjacent group of keys operative, means under control of the last mentioned group for rendering the next adjacent group operative, a plurality of cash safes, and means under control of one of said groups of keys for opening any cash safe desired.

14. In a cash register, the combination of a plurality of groups of keys, one of said groups being normally operative, mechanism for rendering the other groups of keys normally inoperative means operated by any of said operative keys for rendering the adjacent group of keys operative, means under control of the last mentioned group for rendering the next adjacent group operative, a plurality of cash drawers and means under control of the group of keys that was last rendered operative for opening any cash drawer desired.

15. In a cash register, the combination of a plurality of groups of keys, one of said groups being normally operative, mechanism for rendering the other groups of keys normally inoperative means operated by any of said operative keys for rendering the adjacent group of keys operative, means under control of the last mentioned group for rendering the next adjacent group operative, a plurality of cash safes, means under control of one of said groups of keys for opening any cash safe desired, and a recording device that is adapted to produce a record showing which drawer has been released.

16. In a cash register, the combination of three distinct groups of keys, the first group being normally unlocked and the second and third groups normally locked, means controlled by the keys of the first group for unlocking the keys of the second group, means controlled by the keys of the second group for unlocking the keys of the third group, a plurality of cash safes, said safes corresponding in number to the keys of the said third group and connections between each of the keys of the third group and a corresponding cash safe, whereby the operation of one of the keys of said third group will release its cash safe.

17. In a cash register, a normally locked oscillatory hand lever a plurality of normally unexposed cash safes, a plurality of groups of keys representing values, departments and clerks, means for preventing the operation of said keys except in a predetermined order of sequence and means under control of the clerks' keys for exposing any cash safe desired and for releasing the hand lever.

18. In a cash register, a normally locked oscillatory hand lever a plurality of normally locked cash drawers, a plurality of groups of keys representing values, departments and clerks, means for preventing the operation of said keys except in a predetermined order of sequence and means under control of the clerks' keys for unlocking any cash drawer desired and for releasing the hand lever.

19. In a cash register, a plurality of normally unexposed cash safes, a plurality of groups of keys representing values, departments and clerks, means for preventing the operation of said keys except in a predetermined order of sequence, means under control of the clerks' keys for exposing any cash safe desired, and a recording device that is adapted to produce a record showing what safe has been exposed.

20. In a cash register, a plurality of cash drawers, banks of normally depressible value keys, a bank of normally undepressible department keys, said bank including a normally depressible no sale key, a bank of normally undepressible clerks' initial keys, interlocking mechanism for rendering the no sale key inoperative if a value key is depressed, and means connecting each cash drawer with a corresponding initial key, whereby said drawer will be released when its initial key is operated.

21. In a cash register, a plurality of cash drawers, a bank of keys containing normally undepressible department keys and a normally depressible no sale key, a bank of normally undepressible clerks' initial keys, interlocking mechanism for rendering the clerks' initial keys depressible when the no sale key or department key is depressed, and means connecting each cash drawer with a corresponding initial key, whereby said drawer will be released when its initial key is operated.

22. In a cash register, a plurality of cash drawers, a bank of keys containing normally undepressible department keys and a normally depressible no sale key, a bank of normally undepressible clerks' initial keys, interlocking mechanism for rendering the clerks' initial keys depressible when the no sale key or a department key is depressed, means connecting each cash drawer with a corresponding initial key, whereby said drawer will be released when its initial key is operated, and a recording device that is adapted to produce a record showing what safe has been exposed.

23. In a cash register, a bank of keys, means for locking said keys in their operated positions, a normally locked operating member, a plate that is movable upon the depression of any one of said keys, connections between said plate and the operating member for unlocking the latter when a key is depressed, and means carried by said plate for preventing the subsequent operation of any other key in the bank.

24. In a cash register, a bank of keys, means for locking said keys in their operated positions, a normally locked operating member, a plate that is movable upon the depression of any one of said keys, connections between said plate and the operating member for unlocking the latter when a key is depressed, and detent hooks carried by said plate for preventing the subsequent operation of any other key in the bank.

25. In a cash register, a bank of keys, means for locking said keys in their operated positions, a normally locked operating member, a plate that is movable upon the depression of any one of said keys, connections between said plate and the operating member for unlocking the latter when a key is depressed, and detent hooks carried by said plate opposite each key for preventing the subsequent operation of any other key in the bank, and for coupling the plate and the depressed key together.

26. In a cash register, a key board, indicating devices, connections between said key board and said indicating devices whereby the said devices are set to indicate the characters on the operated keys, a flash for concealing said indicating devices, means for throwing said flash out of its operative position so that the indicators may be exposed, a pivoted plate for holding said flash in its inoperative position, and means for moving said plate so as to release the indicator flash and to permit it to be moved to its operative position.

27. In a cash register, a key board, indicating devices, connections between said key board and said indicating devices whereby the said devices are set to indicate the characters on the operated keys, a pivoted flash for concealing said indicating devices, means for throwing said flash out of its operative position so that the indicators may be exposed, a pivoted plate for holding said flash in its inoperative position, a main operating lever, and means for moving said plate so as to release the indicator flash and to permit it to be moved to its operative position, said means being under control of the main operating lever.

28. In a cash register, a key board, indicating devices, connections between said key board and said indicating devices whereby the said devices are set to indicate the character on the operated keys, a normally locked main operating lever, a flash for concealing said indicating devices, means for throwing said flash out of its operative position so that the indicators may be exposed, a pivoted plate for holding said flash in its inoperative position, and a cam connected with the main operating lever, said cam controlling said plate so as to release the indicator flash and to permit it to be moved to its operative position.

29. In a cash register, a key board, indicating devices, connections between said key board and the indicating devices for setting the latter to indicate the characters of the keys, a flash for concealing said indicators, a normally locked operative member, means connected by said operative member for moving the flash to its inoperative position whereby the indicators will be exposed, a plate for holding said flash in its inoperative position, a cam connected with said main operating lever, and means on said cam for moving the plate away from said flash so that the latter may be brought to its operative position.

30. In a cash register, a bank of keys, a main operating lever, a latch for normally locking said operating lever, a plate movable upon the depression of any key in said bank, means carried by said plate for moving the latch and unlocking the main operating lever, means carried by said plate for coupling the key thereto whereby said key is compelled to move with the said plate, and means for locking the key when it is depressed to an extent sufficient to unlock the main operating lever.

31. In a cash register, a bank of keys, a main operating lever, a latch for normally locking said operating lever, a plate movable upon the depression of any key in said bank, means carried by said plate for moving the latch and unlocking the main operating lever, means carried by said plate for coupling the key thereto whereby said key is compelled to move with the said plate, means for locking the key when it is depressed to an extent sufficient to unlock the main operating lever, an alarm gong, and means for sounding said alarm gong substantially at the moment when the main operating lever is released, and also at substantially the moment when said main operating lever is returned to its normal position.

32. In a cash register, a bank of keys, a main operating lever, a latch for normally locking said operating lever, a plate movable upon the depression of any key in said bank, means carried by said plate for moving the latch and unlocking the main operating lever, detent hooks carried by said plate for coupling the key thereto whereby said key is compelled to move with the said plate, said detent hooks locking out the undepressed keys, means for locking the key when it is depressed to an extent sufficient to unlock the main operating lever, an alarm gong, and means for sounding said alarm gong substantially at the moment when the main operating lever is released, and also at substantially the moment when said main operating lever is returned to its normal position.

In testimony whereof, I hereunto affix my signature in the presence of two witnesses.

HENRY S. HALLWOOD.

Witnesses:
EMILIE SMITH,
G. M. GRIDLEY.